United States Patent [19]
Zivalich, Jr.

[11] Patent Number: 5,318,099
[45] Date of Patent: Jun. 7, 1994

[54] METHOD AND APPARATUS FOR EMULATING A PERIMETER INDUCTION UNIT AIR CONDITIONING SYSTEM

[75] Inventor: Tony J. Zivalich, Jr., Atlanta, Ga.

[73] Assignee: Johnson Service Company, Milwaukee, Wis.

[21] Appl. No.: 930,777

[22] Filed: Aug. 17, 1992

[51] Int. Cl.$^5$ ............... F25B 29/00; F24F 13/04; F24F 3/08
[52] U.S. Cl. ............... 165/2; 165/22; 165/16; 165/50; 165/53; 454/266; 454/269; 236/13; 236/49.3
[58] Field of Search ............... 165/50, 22, 16, 2; 454/266, 269; 236/13, 49.3

[56] References Cited

U.S. PATENT DOCUMENTS

| | | | |
|---|---|---|---|
| 2,633,070 | 3/1953 | Gillham | 454/266 |
| 3,193,000 | 7/1965 | Bressoud | 454/269 |
| 3,445,317 | 5/1969 | Marshall et al. | 165/50 |
| 3,823,870 | 7/1974 | Chandler | 454/269 |
| 3,951,205 | 4/1976 | Zilbermann | 454/269 |
| 4,084,389 | 4/1978 | Meckler | 454/269 |
| 4,203,485 | 5/1980 | Zilbermann et al. | 236/13 |
| 4,942,921 | 7/1990 | Haessig et al. | 236/13 |
| 5,127,878 | 7/1992 | Meckler | 454/269 |

FOREIGN PATENT DOCUMENTS

WO9010827  9/1990  European Pat. Off. ........ 165/50

OTHER PUBLICATIONS

Ashrae 1984 Systems Handbook, Chapter 4 "Air-and -Water Systems" pp. 4.1–4.8 (1984), Ashrae Atlanta, Georgia.

Primary Examiner—John K. Ford
Attorney, Agent, or Firm—Joseph E. Root, III; E. L. Levine

[57] ABSTRACT

A method and apparatus for emulating a perimeter induction unit, in which the perimeter induction unit is replaced by an emulation unit carried in a plenum above the space to be heated or cooled. A temperature sensor is mounted within the space, and a computer provides programmed control, either centrally or locally. The emulation unit is connected to the primary air ducts and secondary liquid source formerly used for the perimeter induction unit. It includes a primary air inlet for accepting and regulating a flow of ventilated, preconditioned primary air from the primary air ducts, and a secondary air inlet for accepting a flow of return air from the space as well as filtering the return air and passing it over a heat exchanger carrying secondary cooling liquid at a preselected temperature. Primary and secondary air is mixed within a mixing chamber and delivered to the space by a blower at a preselected combined air volumetric flow rate. A computerized controller implements a control method that allows the system to maintain the space at a selected temperature during summer or intermediate/winter load patterns.

5 Claims, 3 Drawing Sheets (SUMMER)

(SUMMER)

(WINTER/INTERMEDIATE)

METHOD AND APPARATUS FOR EMULATING A PERIMETER INDUCTION UNIT AIR CONDITIONING SYSTEM

BACKGROUND OF THE INVENTION

This invention relates to the field of air conditioning, and more specifically to the field of retrofitting existing air conditioning devices with more effective devices to improve occupant comfort and take advantage of inherent diversity in air conditioning loads.

The perimeter induction unit is a type of air conditioning device that was widely used in non-residential building construction during the period 1950–1975. It should be noted that the term "air conditioning" is used herein in its general sense, encompassing all methods of treating air to obtain desired temperature and humidity levels, including cooling, heating and humidification processes. The perimeter induction unit is described in detail below in connection with FIG. 1, and for the present it suffices to describe this unit as an effort to reduce existing air conditioning construction costs in large buildings by performing a portion of the final air conditioning in the space to be conditioned, rather than centrally. Thus, instead of heating or cooling air centrally and distributing it in relatively large ducts, this system supplies primary air at relatively high pressure in small ducts, together with heated or chilled secondary liquid, so that air from the space could be conditioned as required to achieve to desired temperature and humidity. The result was the units found mounted on the floor at the outer wall of many offices, hotel rooms and the like, easily identified by their intake grilles located adjacent the floor and outlet grilles located in the upper horizontal surface. Most such systems were installed as "two-pipe" systems, having a single liquid supply line and a single liquid return line, shared by the chilled and heated water systems, which of course cannot operate concurrently. This system is described in detail in a number of references, and is well summarized in the 1987 *ASHRAE Handbook: Heating Ventilating and Air-Conditioning Systems and Applications,* published by the American Society of Heating, Refrigerating and Air Conditioning Engineers, at pages 3.1–3.3.

Although the perimeter induction unit did achieve decreased construction costs, it has presented significant problems in service. First, the savings in HVAC system installation is offset by space lost in the heated space, owing to the conditioning unit itself, generally mounted on the floor. This space amounts to about 5–8% of usable floor space in a normal office. Also, this system is particularly unsuited for buildings where large variances in thermal load are experienced. Night building heat loss, coupled with large solar gains require the air conditioning system to be able to provide heating and cooling in the same occupied period. This situation is most prevalent in the early spring and late fall. Unlike buildings using a distributed air system, even zoning the building will not allow for simultaneous heating and cooling of different zones, as the secondary liquid system must be either heated or chilled, not both.

Perhaps most seriously, however, perimeter induction units are inherently susceptible to problems arising during normal use, such as the "bookshelf" effect. The unit is generally about as high as a desk-top or window sill, and the availability of that much flat space in most offices is a magnet for books, papers and the like. These articles cover the outlet grilles, leading to user complaints about poor heating or cooling. Similarly, the secondary heating or cooling that takes place in the unit itself is accomplished by a coil, which is generally protected by a filter. This imposes a maintenance problem greatly exceeding the task of cleaning centrally-located filters, and any lack of such maintenance is soon felt in decreased system effectiveness. Additionally, performance problems may be addressed by inexperience maintenance personnel, or by users themselves, by simply opening secondary liquid flow valves or lowering secondary water temperature in a misguided attempt to improve performance. In fact, such adjustment can produce condensation on the secondary liquid coil, and if the system is not equipped with a condensate removal system (as many are not) then damage to the building rapidly ensues.

Given their many problems, one would expect building owners to abandon perimeter induction units altogether, in favor of modern variable air volume systems. Unfortunately, however, such conversions are not so simple. Primarily, the original justification for perimeter induction units was their small duct requirements, and replacing the entire duct system in an office building is not an attractive option. Structural constraints in vertical ducting and primary equipment spaces virtually eliminate this option. Similarly, some owners have tried to implement a conversion on a floor-by-floor basis rather than installing a central system, but that design requires a mechanical room on each floor, coupled with local duct work and air handling units. Therefore, the expected space gains from such a conversion quickly disappear.

What the art needs, but has not been able to devise, is a way to employ the basic design of the perimeter induction unit system while replacing the units themselves, without requiring replacement of the entire building distribution system. That system is offered in the present invention.

SUMMARY OF THE INVENTION

The broad object of the present invention is a heating, ventilating and air conditioning system that replaces perimeter induction units on a local basis, without requiring replacement of the vertical duct work or secondary liquid distribution system for a building.

A further object of the invention is a heating, ventilating and air conditioning system that improves upon the temperature and humidity control provided by a perimeter induction unit system, while employing the basic primary air and secondary liquid distribution system of a perimeter induction unit system.

These and other objects are achieved in the present invention, a method for emulating a perimeter induction air conditioning unit to condition the air in a space, which comprises the following steps: First, the environmental control parameters for the space are established, including a heating setpoint temperature, a cooling setpoint temperature and minimum and maximum design air flow rates. Next, a plenum above the space is defined between an overhead structure at the upper limit of the space and a ceiling structure, and an emulation unit is provided within the ceiling. The emulation unit includes primary air inlet means for accepting and regulating the flow of ventilated, preconditioned primary air from ducts formerly connected to the perimeter induction unit. Secondary air inlet means accept a flow of return air from the space, filter the return air, and pass the return air over a heat exchange means. The heat exchange means also carries secondary cooling liquid at a preselected temperature, provided from the source formerly used to provide the same to the perimeter induction unit. Combined air supply means mix the primary and secondary air in a mixing chamber and deliver the same to the space, using a blower to exhaust conditioned air from the mixing chamber at a preselected combined air volumetric flow rate. The system senses the temperature in the space and takes control actions responsive to the sensed temperature, employing preset summer and winter/intermediate conditioning modes. These modes include the steps of maintaining the primary air flow at a selected minimum flow rate at space temperatures below the cooling setpoint; proportionately increasing the flow rate to a maximum summer flow rate at temperatures between the cooling setpoint and a selected summer maximum flow temperature above the cooling setpoint In winter/intermediate mode, the system continues to increase the flow rate proportionately to a maximum winter/intermediate flow rate between the summer maximum flow temperature and a winter maximum flow temperature. Also, temperature-conditioned liquid is supplied to the heat exchange means, at a selected chilled temperature in the summer mode and a heated temperature in the winter/intermediate mode, at selected flow rates ranging in the summer mode from no flow at temperatures below a selected summer cooling startup temperature selected above the cooling setpoint and increasing proportionately to maximum flow at a summer cooling maximum temperature. In the winter/intermediate mode the flow rate ranges from maximum flow at temperatures below a winter heating minimum temperature selected below the heating setpoint and decreases proportionately to no flow at the heating setpoint. The system regulates the combined air flow rate by varying the blower means to deliver the minimum design air flow rate at temperatures below a blower startup point selected between the heating setpoint and the cooling setpoint, and the maximum design air flow rate at the cooling setpoint.

DETAILED DESCRIPTION OF A PREFERRED EMBODIMENT

Figure 1:
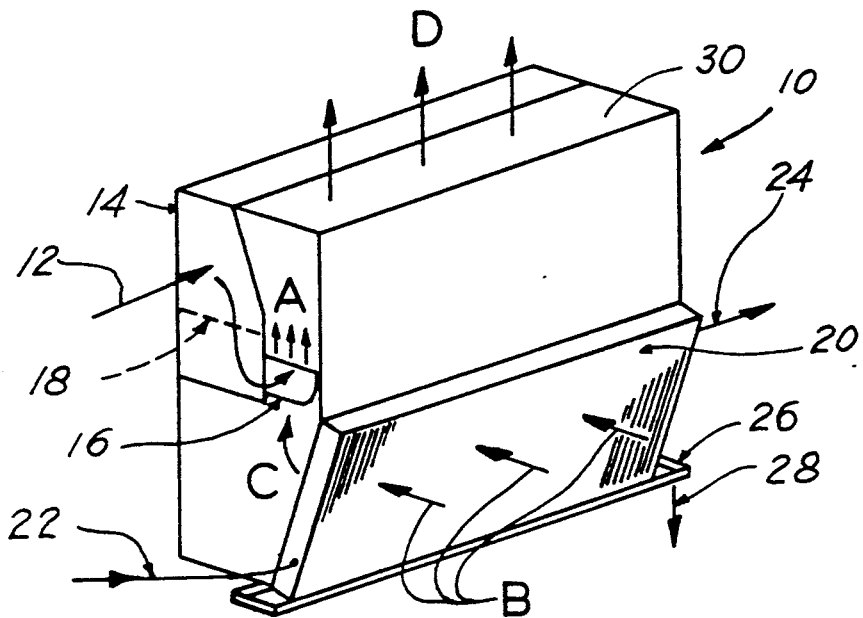
FIG. 1 is a schematic representation of a perimeter induction unit as currently known to the art.

A typical perimeter induction unit (PIU) 10 of the prior art is shown schematically in FIG. 1. There, high-pressure ducting 12 feeds primary air into a nozzle assembly 16, through which the air is introduced into plenum 14. A damper 18 may be used to control the air flow volume. The high velocity jets A of primary air induce a flow of room air, depicted by arrows B and C, which mix with the primary air in the plenum to form a combined flow D, directed back into the space from the top of the PIU. The room air flows through a filter element 20, generally positioned at the bottom of the PIU. Secondary liquid is provided to sensibly cool or heat the room air, through secondary liquid supply line 22, which feeds the heating/cooling coil (not shown) located immediately behind the filter element 20, and back to the central source via return line 24. Any known coolant liquid could be used in this application, but the overwhelming majority of installations employ water, chilled or heated, for this purpose. PIU's are designed to perform with a "dry coil"—that is, with the relationship between coil temperature and room temperature and humidity such that the coil does not lower the room air flow to its dew point. Most PIU installations do not provide for the failure of that design assumption, but if such protection is desired, it takes the form of a condensate pan 26 with condensate drain 28.

Figure 2:
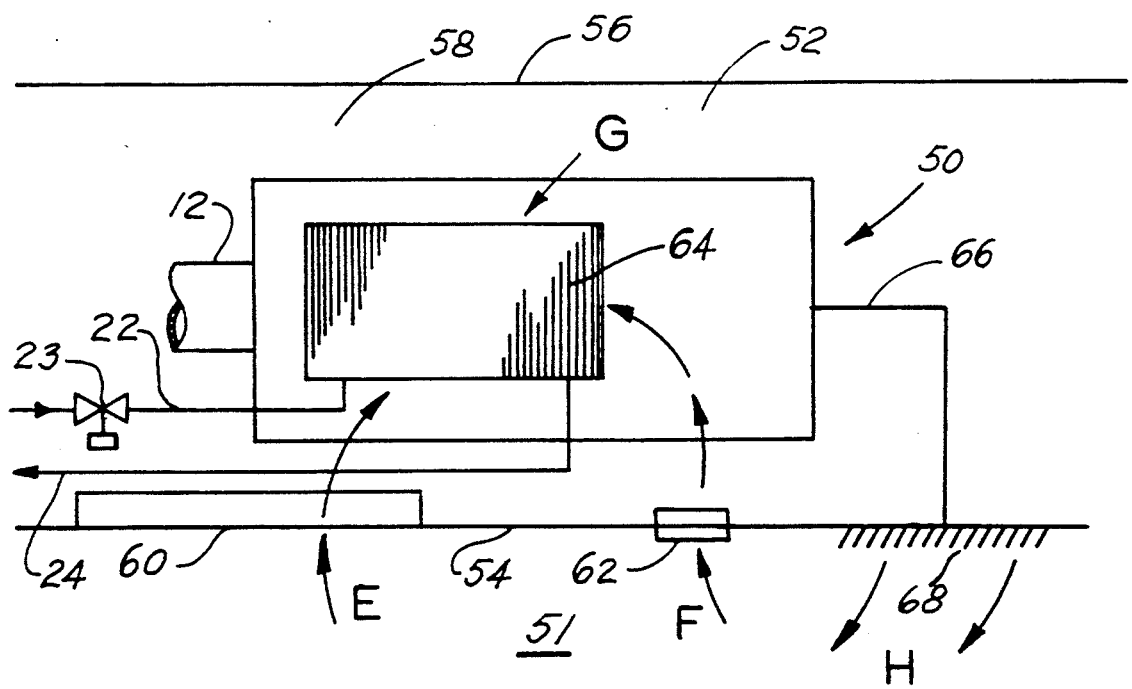
FIG. 2 is a schematic representation of an embodiment of the present invention.

A PIU Emulation Unit according to the present invention is shown in FIG. 2. This unit is located in the ceiling above the space 51, so that the dropped ceiling 54 and overhead structure 56 define a plenum 58 above the space. The overhead structure may be the structure for the next floor, or for the roof, depending on the construction details of the particular space. Room for such a plenum is generally available above commercial office and hotel room locations. The Emulator is served by the same primary air line 12 and secondary liquid supply and return lines 22, 24 as were present for the PIU itself, under control of secondary liquid valve 23. As noted above, the normal secondary liquid for such situations is water, and it is preferred to continue that use, either chilled (for sensible cooling) or heated (for heating). A major difference is that primary air is provided to a PIU at relatively high pressure, on the order of 1.5 inches water (gage), but here the pressure need only be about 0.1–0.2 inches water (gage). The lower pressure translates directly to reduced primary air system operating cost, as will be understood by those in the art.

Room air is fed to the Emulator over two paths. First, air flows through light fixtures, such as fixture 60, following arrows E from the space to secondary air filter 64 and thence into the Emulator. This flow path provides a subsidiary benefit of directly removing heat from the light fixture, rather than waiting for this heat to penetrate into the space. In a cooling regime, early removal of such heat improves the stability of the space temperature, contributing to occupant comfort. If the system is in a heating mode, the secondary air is being heated directly, easing the burden on the secondary liquid heating. A second air path F can be provided if desired, or if needed based on air volume calculations, through return vent 62. This vent is preferably located in the ceiling adjacent a curtain wall, to add or remove heat from that location efficiently in a manner similar to that described for the light fixtures, above. Of course, air already in the plenum is also drawn into the Emulator, following path G.

Conditioned air is routed to the space though outlet ductwork 66, which discharges though, for example, grille 68 on a path shown by arrows H. It should be understood that a single Emulator 50 may replace one or more PIU's, based on design considerations familiar to those in the art. Care should be exercised to insure that if multiple spaces are served by a single unit, those spaces see nearly identical solar and transient loads. If, for example, one space received a high solar load while another remained in shade, the temperature differential between the spaces would insure that occupants of at least one space would be uncomfortable. Proper design can achieve considerable savings by grouping adjacent spaces into heating/cooling zones, and it is expected that Emulators will be so employed.

Figure 3:
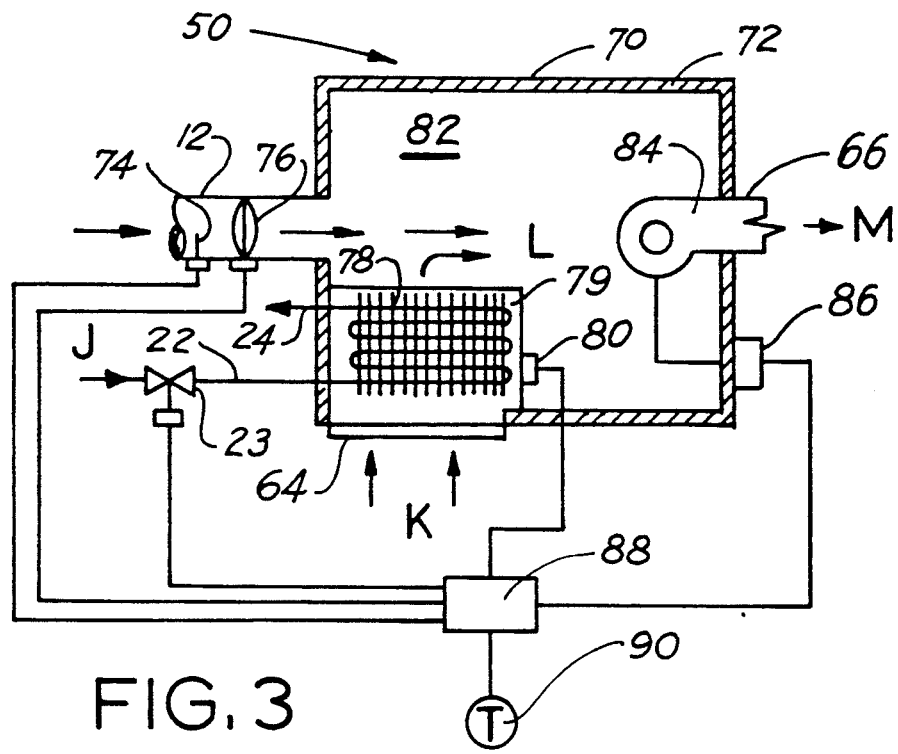
FIG. 3 is a detailed schematic representation of a portion of the embodiment shown in FIG. 2.

A more detailed view of the Emulator is shown schematically in FIG. 3. The unit housing 70 is preferably constructed much like a conventional ceiling-mounted variable air volume (VAV) box, having a rectangular form, sheetmetal exterior and thermal/acoustic insulating layer 72, formed from a known material such as fiberglass. The primary air supply, shown by arrows J, is centrally conditioned, preferably about 50 degrees F. with a relative humidity of about 90% The unit control system is discussed in detail below, but it should be noted at this point that the primary air flow J into the unit is controlled by damper/actuator 76, with flow information provided by flow velocity sensor 74, both of which are positioned in the duct adjacent the connection to the unit. Both of these elements are preferably chosen from among the many such items known to the art, with flow velocity sensor 74 being based on pressure sensing (using, for example, a multi-point pressure probe) or other technology (such as, for example, a vortex-shedding flowmeter).

The primary airflow M induces a secondary flow from the plenum, shown by arrows K, which enters the unit through filter 64 and flows across heat exchanger 78, which is a coil unit well known to the art. A condensate pan 79 is positioned to catch any inadvertent condensation runoff from the coil members, and the pan is equipped with a moisture sensor 80, as discussed below.

Mixing chamber 82 occupies most of the interior space of the Emulator, allowing the primary and secondary air flows to mix, producing combined flow L. A blower 84 exhausts this flow into outlet ductwork 66 to the space, as shown by arrow M. Fan speed controller 86 varies the blower speed, as explained below.

Control for the Emulator is provided by system controller 88, a microprocessor-based controller capable of storing and executing a control algorithm such as the system outlined below. Although a stand-alone computer could be provided for each Emulator, it is preferable that the controller be a part of a facilities management system controlling many similar systems, as well as handling functions such as access control, fire alarms and the like, for an entire building. An example of such a system is the METASYS facilities management system provided by Johnson Controls, Inc. In relation to the present invention, it does not matter what form the controller hardware takes, so long as it executes the algorithm set out below. Thus, those in the art will understand that controller 88 is set out and treated as a separate unit for discussion purposes only. The control system is connected, using appropriate wiring means, to primary air damper/actuator 76 and velocity sensor 74; secondary fluid valve 23; fan speed control 86; condensate moisture detector 80; and a temperature sensor 90 located within the space.

Figure 4A:
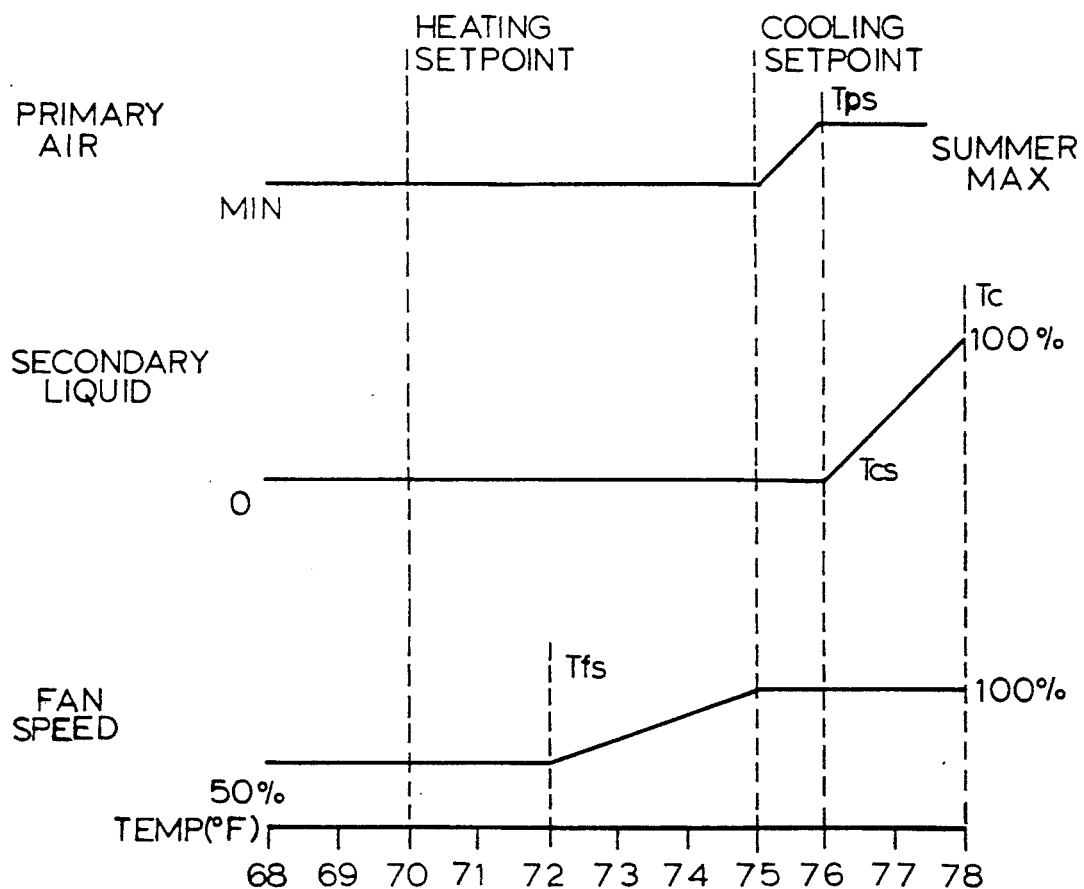
FIGS. 4(a) and (b) are diagrams plotting the control sequence followed by the embodiment of the present invention shown in FIG. 2.
Figure 4B:
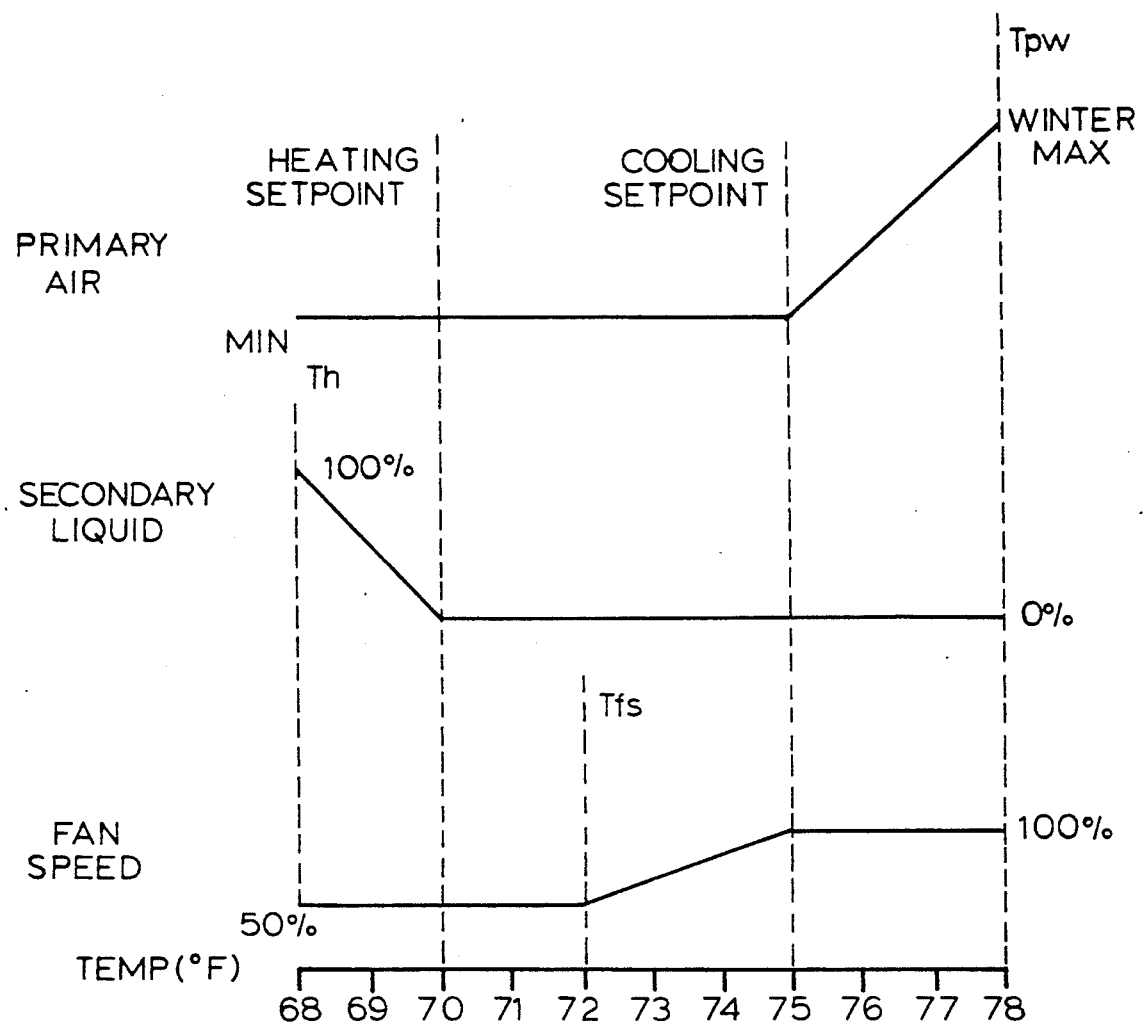

System control is achieved using three variables: primary air flow rate, secondary liquid flow rate, and fan speed. FIGS. 4(a) and 4(b) diagram the control sequence employed by the Emulator, plotting these variables against the space temperature as determined by temperature sensor 90. Fan speed is plotted as a percentage of maximum airflow to be delivered to the space. Secondary liquid is shown as a percentage of maximum flow (or, equivalently, into a valve setting) Primary air flow varies between a minimum level (which may be determined by minimum ventilation standards, such as ASHRAE Standard 62R1989 or similar local code) and a predetermined maximum Summer and maximum Winter rates, determined as is conventional within the art for HVAC systems. Typical values of the heating setpoint (70 degrees F.) and cooling setpoint (75 degrees F.) are shown, but of course the user could change such settings as desired Setpoints are preset into the controller in a manner dictated by the particular controller design, as understood in the art.

Generally, the system operates in one of two modes, each of which has a separate response algorithm. In each instance, the controller receives an indication of the space temperature from temperature sensor 90 measures the duration and extent of the difference from setpoint, and then signals the actions specified in the control algorithm for that temperature. During the summer months, the system operates in a Summer Mode, plotted in FIG. 4(a). A Winter/Intermediate Mode is shown in FIG. 4(b).

In the Summer Mode, the system is geared primarily to maintaining space temperature at or below the cooling setpoint. Following the sequence of events from lower to higher temperatures, it can be seen that at temperatures below the heating setpoint the fan speed is set at 50% of maximum, with the primary air setting at a minimum setting consistent with ventilation and dehumidification requirements. Secondary liquid flow (which in this case would be chilled water) is off. As known by those in the art, empirical values are used to balance the flow of fresh primary air with the induced flow of secondary air, but in a retrofit situation such flow calculations will already have been done for the pre-existing PIU's. As temperature increases toward the cooling setpoint, a fan startup temperature, shown in FIG. 4(a) as $T_{FS}$, is reached, intermediate between the heating and cooling setpoints. Starting at this temperature, the fan speed is increased at a rate such that it reaches 100% of capacity at the cooling setpoint. A further rise in the temperature above the cooling setpoint results in the primary air damper being opened, extending from a minimum position proportionately on a pressure independent basis to a maximum position at a summer maximum flow position, shown in FIG. 4(a) as $T_{PS}$. If the setpoint is not achieved or if in space temperature rises still further, above a cooling start point, shown in FIG. 4(a) as $T_{CS}$, the secondary liquid control valve, is progressively opened from the fully closed position to fully open to satisfy the zone demand, shown in FIG. 4(a). As shown here, the cooling start point temperature is selected to the summer sequence, the primary air followed by the secondary liquid, but that condition can be altered if desired. This relationship is preferred, however, as it provides a smooth response to zone demand. In the embodiment shown here, the particular temperatures are as follows: $T_{FS}=72$; $T_{PS}=T_{CS}=76$; and $T_C=78$, all in degrees F. These values are typical, but may be altered to fit other system designs.

The system cooling strategy can be summarized as follows: At temperatures below the cooling setpoint, the system relies on increasing airflow which increase occupant comfort through increased ventilation while maintaining the minimum primary air. The initial response to temperatures above the cooling setpoint is to increase the proportion of primary to secondary air, holding airflow at a constant maximum level. After primary airflow has been increased to a maximum, continued deviation from setpoint is met by cooling the secondary air, using a secondary liquid heat exchanger.

Operation in a Winter/Intermediate mode is quite different, as seen in FIG. 4(b). There, as temperature falls from the cooling setpoint, primary airflow is held at a level sufficient only to satisfy space minimum ventilation and humidification requirements. Reversing the process described above, blower speed is reduced from a maximum at the cooling setpoint to a minimum (chosen here a 50% of capacity) at the fan startup temperature ($T_{PS}$) In this mode, of course, the secondary liquid is heated water, and the secondary liquid flow is held at zero until the space temperature falls to the heating setpoint. Further temperature loss is countered by increasing the flow of secondary liquid proportionately until the temperature reaches a maximum heating temperature, $T_H$, which in this embodiment is 68 degrees F. If space temperature should rise above the cooling setpoint in this mode, the system responds with increased primary airflow, starting at the cooling setpoint and increasing to a winter maximum flow at a winter maximum flow temperature, $T_{PW}$ (here, 78 degrees F.). It should be noted that the winter maximum flow rate is above the summer maximum rate, as no secondary this manner during the winter and intermediate mode allows the system of emulators to respond to inherent load diversity in the building and reclaim cool air from adjacent zones in heating response or are satisfied. Primary air is directed to zones requiring cooling to satisfy solar, occupant and building loads. As with the summer mode, the particular set points can be altered.

The heating strategy can be summarized as follows: As temperature falls below the cooling setpoint, system airflow is reduced, with fan speed hitting a chosen minimum value at a fan startup temperature between the heating and cooling setpoints. At the heating setpoint, the flow of secondary (heated) liquid commences, increasing to a maximum level at a maximum heating temperature below the heating setpoint. Primary airflow is held at a minimum level for all temperatures below the cooling setpoint, but any cooling requirements are met by increasing primary airflow, up to a winter maximum flow rate, greater than the summer maximum flow, at a winter maximum flow temperature.

The secondary heat exchanger is designed to function as a "dry coil", so system parameters should be set to avoid cooling secondary air to its dew point If a high latent load is presented, so that condensation does occur, runoff is collected in the condensate pan 79, and moisture sensor 80 signals the controller to that effect. The controller responds by opening the primary air damper 76 to a full open position, allowing the cool dry primary air to dehumidify the space. This situation is most likely to occur in the summer mode, given normal winter atmosphere conditions.

It should be understood that a number of changes and modifications can be made in the embodiment discussed above, all within the spirit of the invention. For example, the specific temperatures for the various control points are typical but not limiting. One could alter these temperatures without departing from the scope of the invention, which is defined solely by the claims appended hereto.

I claim:

1. A method for emulating a perimeter induction air conditioning unit to condition the air in a space, comprising the steps of:

establishing environmental control parameters for the space, including a heating setpoint temperature, a cooling setpoint temperature and minimum and maximum design air flow rates;

defining a plenum above the space, located between an overhead structure at the upper limit of the space and a ceiling structure;

providing an emulation unit within said ceiling, said emulation unit including primary air inlet means for accepting and regulating the flow of ventilated, preconditioned primary air from ducts formerly connected to the perimeter induction unit;

secondary air inlet means for accepting a flow of return air from the space, filtering said return air, and passing said return air over a heat exchange means, said heat exchange means carrying secondary cooling liquid at a preselected temperature, said cooling liquid provided from the source formerly used to provide the same to the perimeter induction unit;

combined air supply means for mixing said primary and secondary air and for delivering the same to the space, including mixing chamber means for accomplishing said mixing and blower means for exhausting conditioned air from said mixing chamber means at a preselected combined air volumetric flow rate;

sensing the temperature in the space;

taking control actions responsive to said sensed temperature, employing preset summer and winter/intermediate conditioning modes, including the steps of maintaining said primary air flow at a selected minimum flow rate at space temperatures below said cooling setpoint: proportionately increasing said flow rate to a maximum summer flow rate at temperatures between said cooling setpoint and a selected summer maximum flow temperature above said cooling setpoint in both said summer mode and said winter/intermediate mode; and continuing to increase said flow rate proportionately in said winter/intermediate mode to a maximum winter/intermediate flow rate between said summer maximum flow temperature and a winter maximum flow temperature;

supplying temperature-conditioned liquid to said heat exchange means, at a selected chilled temperature in said summer mode and a heated temperature in said winter/intermediate mode, at selected flow rates ranging in said summer mode from no flow at temperatures below a selected summer cooling startup temperature selected above said cooling setpoint and increasing proportionately to maximum flow at a summer cooling maximum temperature; and in said winter/intermediate mode ranging from maximum flow at temperatures below a winter heating minimum temperature selected below said heating setpoint and decreasing proportionately to no flow at said heating setpoint;

regulating said combined air flow rate by varying said blower means to deliver said minimum design air flow rate at temperatures below a blower startup point selected between said heating setpoint and said cooling setpoint, and said maximum design air flow rate at said cooling setpoint.

2. The method of claim 1, wherein said flow of primary air is preconditioned such that said heat exchange means will not cause liquid condensation from said primary air.

3. The method of claim 1, further including the step of collecting and disposing of any condensate forming on said heat exchange means.

4. Apparatus for emulating a perimeter induction air conditioning unit to condition the air in a space, the perimeter induction unit having been provided with primary air ducts and a source of secondary liquid, comprising:

an emulation unit carried within a plenum above the space, said plenum defined by an overhead structure at the upper limit of the space and a ceiling structure below said upper limit, said emulation unit including primary air inlet means for accepting and regulating a flow of ventilated, preconditioned primary air from the primary air ducts;

secondary air inlet means for accepting a flow of return air from the space; filtering said return air; and passing said return air over a heat exchange means, said heat exchange means carrying secondary cooling liquid provided from the secondary liquid source at a preselected temperature;

combined air supply means for mixing said primary and secondary air and for delivering the same to the space, including mixing chamber means for accomplishing said mixing and blower means for exhausting conditioned air from said mixing chamber means at a preselected combined air volumetric flow rate;

sensor means for sensing the temperature in the space and providing a signal proportionate thereto;

control means, operatively connected to said emulator means and said sensor means, including data storage means for storing established environmental control parameters for the space, including a heating setpoint temperature, a cooling setpoint temperature and minimum and maximum design air flow rates;

control processing means for taking control actions responsive to said sensed temperature, employing preset summer and winter/intermediate conditioning modes, said control actions including maintaining said primary air flow at a selected minimum flow rate at space temperatures below said cooling setpoint; proportionately increasing said flow rate to a maximum summer flow rate at temperatures between said cooling setpoint and a selected summer maximum flow temperature above said cooling setpoint in both said summer mode and said winter/intermediate mode; and continuing to increase said flow rate proportionately in said winter/intermediate mode to a maximum winter/intermediate flow rate between said summer maximum flow temperature and a winter maximum flow temperature;

supplying temperature-conditioned liquid to said heat exchange means, at a selected chilled temperature in said summer mode and a heated temperature in said winter/intermediate mode, at selected flow rates ranging in said summer mode from no flow at temperatures below a selected summer cooling startup temperature selected above said cooling setpoint and increasing proportionately to maximum flow at a summer cooling maximum temperature; and in said winter/intermediate mode ranging from maximum flow at temperatures below a winter heating minimum temperature selected below said heating setpoint and decreasing proportionately to no flow at said heating setpoint;

regulating said combined air flow rate by varying said blower means to deliver said minimum design air flow rate at temperatures below a blower startup point selected between said heating setpoint and said cooling setpoint, and said maximum design air flow rate at said cooling setpoint.

5. The apparatus of claim 4, wherein said control means is an electronic microcomputer.

* * * * *